United States Patent [19]

Nakamura et al.

[11] Patent Number: 4,842,392
[45] Date of Patent: Jun. 27, 1989

[54] OBJECTIVE LENS DRIVING UNIT

[75] Inventors: Hiroyuki Nakamura, Kobe; Masashi Ito, Settsu; Toshiki Itoi, Nara; Akifumi Hashimoto, Neyagawa, all of Japan

[73] Assignee: Matsushita Electric Industrial Co., Ltd., Kadoma, Japan

[21] Appl. No.: 52,922

[22] Filed: May 22, 1987

[30] Foreign Application Priority Data

May 26, 1986 [JP] Japan ................... 61-120538
May 26, 1986 [JP] Japan ................... 61-120539

[51] Int. Cl.⁴ .............................................. G02B 7/11
[52] U.S. Cl. ................... 350/247; 350/252; 350/255; 369/44; 369/45
[58] Field of Search ........... 350/247, 255, 252; 369/44-45

[56] References Cited

U.S. PATENT DOCUMENTS 4,669,823  6/1987  Iguma et al. .................... 350/247

FOREIGN PATENT DOCUMENTS 2159293  11/1985  United Kingdom ............... 250/255
2161955  1/1986  United Kingdom ............... 350/255

OTHER PUBLICATIONS

EP0092997, 11-1983, Kido.

Primary Examiner—Rodney B. Bovernick
Assistant Examiner—Martin Lerner
Attorney, Agent, or Firm—Cushman, Darby & Cushman

[57] ABSTRACT

In an objective lens driving unit, an objective lens (12) is fixed to a coil bobbin (11), which has a focus drive coil (13a) wound therearound with its axis coaxial with the axis of the objective lens (12) and tracking dive coils (13b, 13c) wound thereon with their axes perpendicular with the axis of the objective lens (12), and the focus drive coil (13a) and the tracking drive coils (13b, 13c) are put in an open magnetic field produced by a magnetic yoke (14) having permanent magnets (15a, 15b), which makes magnetic flux to cross the coils, thereby to drive the objective lens (12); thus the size of the unit is decreased and made light, and further, the weight of the moving part is made light, to boost sensitivity thereby.

4 Claims, 5 Drawing Sheets

FIG. I(A)
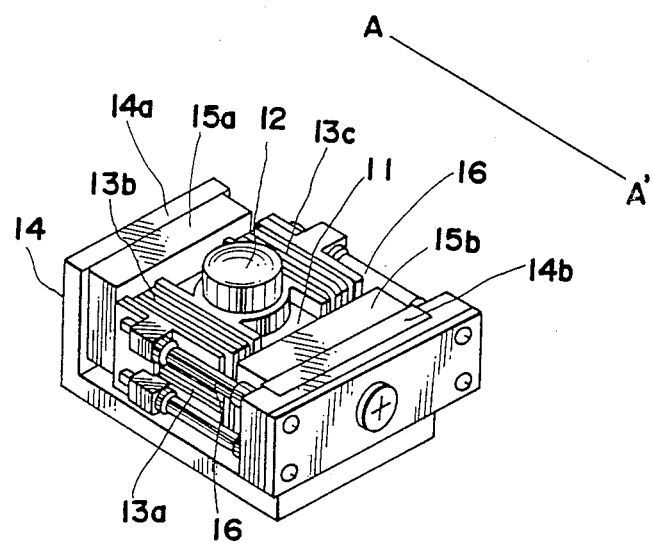
FIG. I(B)
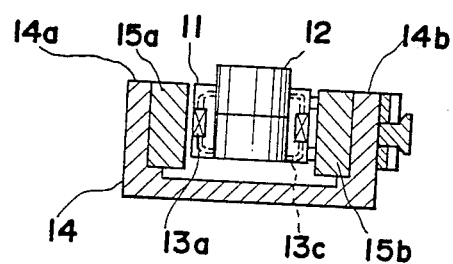

FIG.4 (A) (Prior Art)
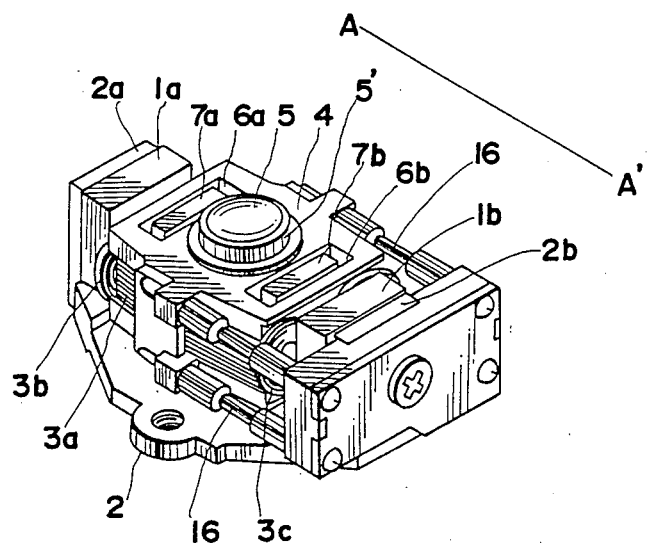
FIG.4 (B) (Prior Art)
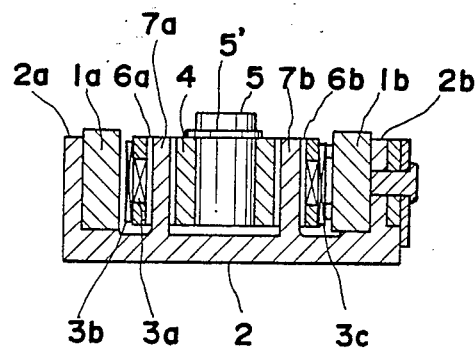

OBJECTIVE LENS DRIVING UNIT

FIELD OF THE INVENTION AND RELATED ART STATEMENT

1. Field of the Invention

The present invention relates to objective lens driving unit, and more particularly to an electromagnetic driving unit for driving objective lens of an optical pick-up which emits light beam on an optical disk recorded with high density digital signal and read optical information of reflected light from the disk.

2. Description of the Related Art

Hitherto, objective lens driving unit has been used for driving light beam in two directions, namely, in focusing movement direction or in tracking direction, in order to respond swinging and slight curving of surface of light disk. In FIG.4(A) and FIG.4(B), which are a perspective view and a sectional view at A—A' sectional plane view shown in FIG.4(A), respectively, a bobbin 4 having a focus drive coil 3a and tracking drive coils 3b and 3c is mounted in a magnetic circuit constituted by a magnetic yoke 2 and permanent magnets 1a and 1b fixed fixed on respective side members 2a and 2b of the magnetic yoke 2. The bobbin 4 is held movably in the focusing and tracking directions by flexible holders 16. An objective lens 5 mounted in a metallic lens barrel 5' is held in the bobbin 4, so that the objective lens 5 is driven in either of the focusing movement direction or in the tracking direction.

In such conventional objective lens driving unit, a closed magnetic circuit structure is constituted by forming a pair of yoke wings 7a and 7b on the magnetic yoke 2, and by inserting them in respective hollows 6a and 6b of the bobbin 4.

However, the above-mentioned conventional construction has such problems that the provision of the hollows 6a and 6b increases size of the bobbin 4, and hence the total length of the focus drive coil 3a thereby inducing increase of weight of the moving parts. Furthermore, since the tracking drive coils 3b and 3c must be formed in a configuration of having no core for winding therein, they need many steps of works in bonding them to the bobbin 4. Besides, the increase of the focus-drive coil 3a induces undue increase of coil resistance. As a result of the above-mentioned problems, size of the conventional objective lens driving unit can not be miniaturized, nor cost thereof can be sufficiently low.

OBJECT AND SUMMARY OF THE INVENTION

Therefore, the object of the present invention is to provide an improved objective lens driving unit having miniaturized size and low manufacturing cost.

In order to achieve the above-mentioned object, the objective lens driving unit in accordance with the present invention comprises:

a movable bobbin having an objective lens fixed thereto, a focus drive coil wound thereon, and tracking drive coils wound thereon with its axial direction perpendicular to the axial direction of the focus drive coil, and a magnetic circuit having at least one permanent magnet and a magnetic yoke for forming a magnetic flux to cross the focus drive coil and the tracking drive coil.

By adopting the above-mentioned construction of disposing the magnetic yoke and the permanent magnet outside the coil bobbin having the objective lens fixed therein, the unit in accordance with the present invention has the following advantages:

(i) Moving part consisting of the coil bobbin, coils wound thereon and the objective lens are of small size and light-weight, thereby enabling miniaturization of the whole objective lens driving unit.

(ii) Since the mechanical configuration of the bobbin becomes simple, the steps of winding the coils become simple and total manufacturing cost becomes small.

(iii) Since the size of the coil bobbin becomes smaller than the conventional one, the sizes of the coils become smaller than the conventional one, and therefore, the total lengths, hence the total resistances, of the coils can be decreased, and as a consequences of becoming the light weight and the smaller resistances the power consumptions for driving the unit can be made smaller.

BRIEF DESCRIPTION OF THE DRAWING

FIG. 1(A) is a perspective view showing an embodiment of an objective lens driving unit for an optical pick-up in accordance with the present invention.

FIG. 1(B) is a cross-sectional view sectioned by a plane which includes an axis of an objective lens (12) and is in parallel with line A—A' in FIG. 1(A).

FIG. 4(A) is the perspective view showing the conventional objective lens driving unit for an optical pick-up FIG. 4(B) is the cross-sectional view sectioned by a plane which includes an axis of an objective lens (5) and is in parallel with line A—A' in FIG. 4(A).

DESCRIPTION OF THE PREFERRED EMBODIMENT

Figure 2A:
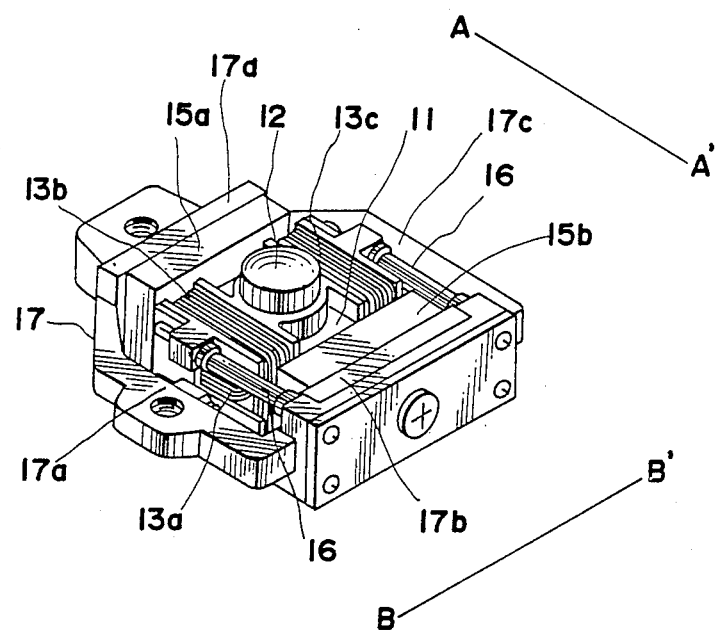
FIG. 2(A) is a perspective view showing another embodiment of an objective lens driving unit for an optical pick-up in accordance with the present invention.

A preferred embodiment of the present invention is shown in FIG. 1(A) and FIG. 1(B).

As shown in these figures, an objective lens 12 is fixed to a bobbin 11, a focus drive coil 13a is wound on the bobbin 11 in a coaxial relation with the axis of the objective lens 12, and two tracking drive coils 13b and 13c are wound on the bobbin 11 with their axial direction perpendicular to the axis of the objective lens 12, in order to drive the objective lens in directions of focusing and tracking, respectively. The bobbin 11 is held movably in the focusing and tracking directions by flexible holders 16. A magnetic yoke 14 has a substantially U-shaped configuration, and the bobbin 11 is put between both side elevation members 14a, 14b of the magnetic yoke 14. A pair of permanent magnets 15a and 15b are fixed to the magnetic yoke 4 so as to face the bobbin 11, thereby to form a magnetic circuit together with the magnetic yoke 14.

Therefore, in this embodiment, the permanent magnetic 15a and 15b and the magnetic yoke 14 are not disposed inside the bobbin 11 but disposed only outside a moving space of the bobbin 11. This structure requires no apertures to receive the magnetic yoke wings inside the bobbin 11 unlike the prior art and enables to make the bobbin 11 small. Furthermore, ineffective part of a focus driving coil 13a can be shortened, and thereby coil resistance is reduced and weight of the coil is decreased. Therefore, the whole weight of moving parts can be decreased by miniaturizing the bobbin 11. As a result of decrease of weight of the moving part, compliance (c) of a supporter 16 to keep a resonance frequency (fo) constant, which is determined by the weight (m) of moving parts and the compliance (c) of supporter 16 given in the following relation can be made large:

$$fo = \frac{1}{2\pi \sqrt{mc}}$$

Thereby the sensitivity of the objective lens driving unit can be increased.

Further, since coil resistance is reduced, a supply voltage can be lowered and a power consumption can be reduced. Though a magnetic circuit which has no internal yoke generally has a low efficiency, in this embodiment, the efficiency lowering of the magnetic circuit is compensated by the light weight of the moving part. It is an advantage of this invention against the prior art that the whole configuration of the objective lens driving unit can be miniaturized by miniaturizing the bobbin 11 and the coil 13a. Recently, an objective lens is improved to light weight ones by changing material of the objective lens from an assembly of glass lenses to a non-spherical single lens of a plastic or glass. Therefore, weight ratio of the bobbin and the coil to the whole weight of the moving parts become large, so that the configuration of this embodiment gives a remarkable advantage in industrial and technical points of view.

Furthermore, in this embodiment, steps in manufacture in winding and assembling are reduced in comparison with those of conventional coil having no core for winding therein.

As mentioned above, this embodiment enables the objective lens driving unit to make not only small size but also low cost.

Figure 2B:
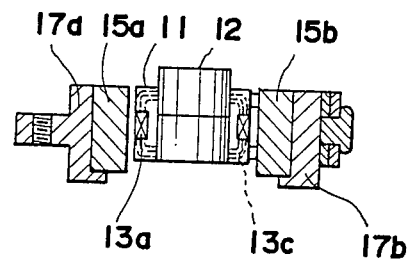
FIG. 2(B) is a cross-sectional view sectioned by a plane which includes an axis of an objective lens (12) and is in parallel with line A—A' in FIG. 2(A).
Figure 2C:
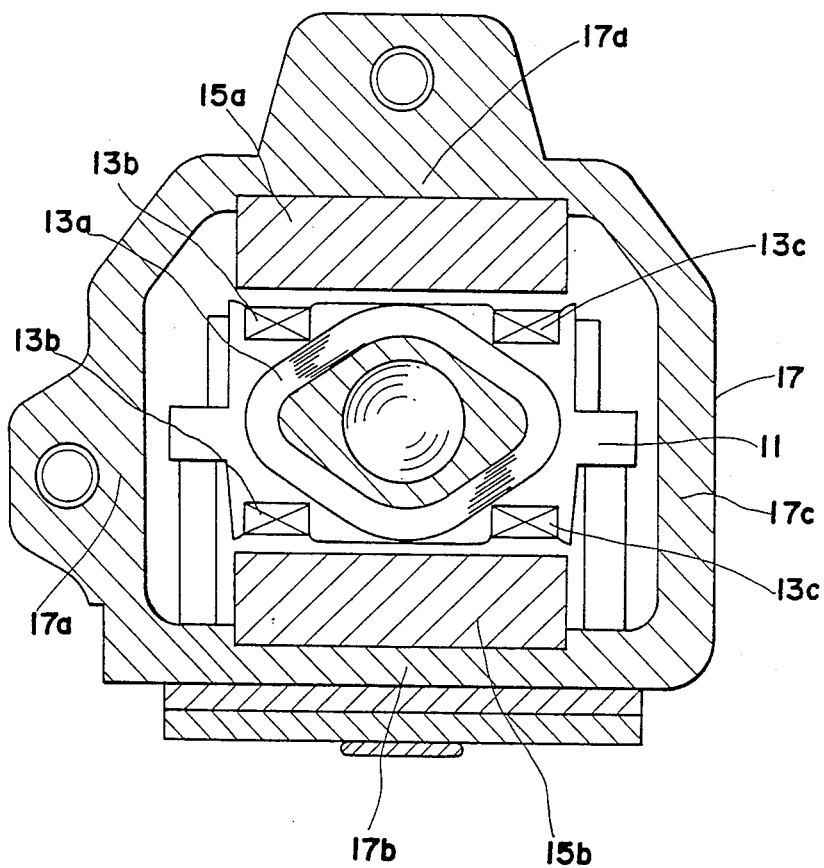
FIG. 2(C) is a cross-sectional view sectioned by a plane which includes a focus drive coil (13a) and is in parallel with line B—B' in FIG. 2(A).

Next, another preferred embodiment of the present invention is shown in FIG. 2(A) and FIG. 2(B) and FIG. 2(C).

As shown in these figures, an objective lens 12 is fixed to a bobbin 11, a focus drive coil 13a is wound on the bobbin 11 in a coaxial relation with the axis of the objective lens 12, and two tracking drive coils 13b and 13c are wound on the bobbin 11 with their axial direction perpendicular to the axis of the objective lens 12, in order to drive the objective lens in directions of focusing and tracking, respectively. The bobbin 11 is held movably in the focusing and tracking directions by flexible holders 16. A magnetic yoke 17 consisting of four peripheral parts 17a and 17b and 17c and 17d is formed in a rectangle to surround the bobbin 11, hence to loop magnetic circuit, on a perpendicular surface to an optical axis of the objective lens 12. Permanent magnetic 15a and 15b are fixed to the magnetic yoke 17 so as to face the bobbin 11.

Figure 3:
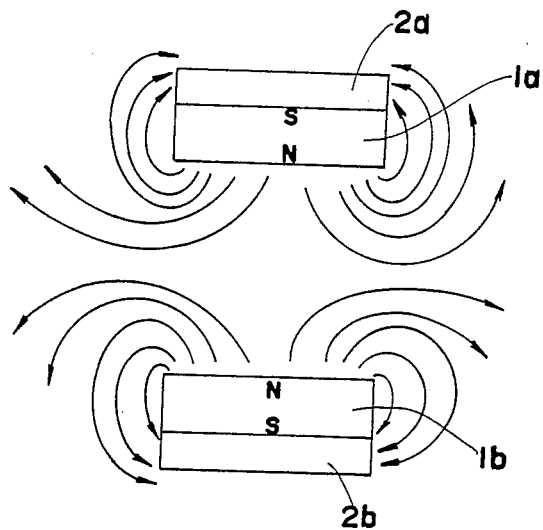
FIG. 3(A) is a plan view showing an open magnetic circuit.
FIG. 3(B) is a plan view showing an open magnetic circuit of an embodiment of an objective lens driving unit for an optical pick-up in accordance with the present invention.
Figure 3:
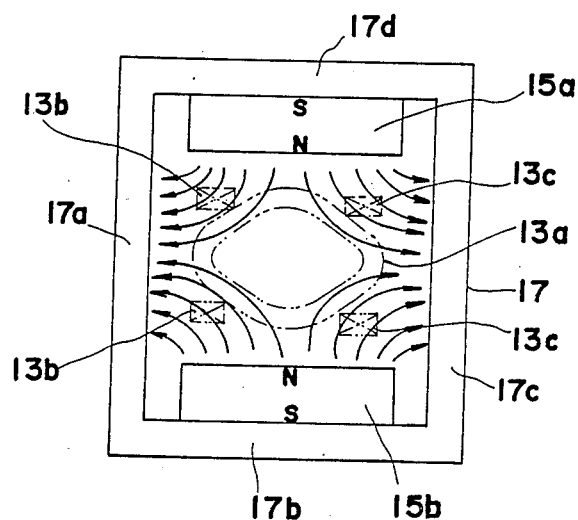

In the above-mentioned structure, magnetic fluxes generated from permanent magnets 15a and 15b traverses and crosses coils 13a and 13b and 13c as shown in FIG. 3(B). Thus a magnetic circuit is looped in the magnetic yoke 17. This structure requires no apertures to receive the magnetic yoke wings inside the bobbin 11, and enables to miniaturize the bobbin 11. Therefore, compliance of a supporter 16 can be made large and hence the sensitivity of the objective lens driving unit can be made high similarly to the first embodiment. Further, ineffective part of a focus driving coil 13a can be shortened, thereby reducing power consumption through decrease of coil resistance.

Though a magnetic circuit which has no internal yoke generally has lower efficiency, than that which has the internal yoke, a magnetic circuit of this embodiment as shown FIG. 3(B) has a lower magnetic reluctance, hence a higher efficiency, than a completely open magnetic circuit shown in FIG. 3(A). Further, because of drastically reduced weight, motion of the moving parts becomes much more sensitive than the prior art and thereby, the efficiency lowering of the magnetic circuit due to omission of the internal yoke is sufficiently overcome. This embodiment also has an advantage against the prior art that the whole of the objective lens driving unit can be miniaturized, as a result of miniaturization of the bobbin 11 and the coil 13a. Especially in this embodiment, the magnetic fluxes generated by magnets 15a and 15b form a closed magnetic circuit within the magnetic yoke 17 which is disposed to surround the bobbin 11. Therefore, a high magnetic flux density which traverses the coils 13a and 13b and 13c can be obtained in comparison with some prior art having no magnetic yoke and for instance the first embodiment having the magnetic yoke under the bobbin 11, and thereby an efficiency of magnetic circuit is improved.

What is claimed is:

1. An objective lens driving unit comprising:
   a movable bobbin having an objective lens fixed thereto and drive coils wound thereon, and
   a magnetic circuit having at least one permanent magnet and a magnetic yoke for forming a magnetic flux to cross said drive coils, wherein said magnetic yoke has looped peripheral parts completely encircling said bobbin so that a plane transverse to the axis of said lens which intersects said magnetic yoke also intersects said bobbin.

2. An objective lens driving unit comprising:
   a movable bobbin having an objective lens fixed thereto, a focus drive coil wound thereon, and tracking drive coils wound thereon with its axial direction perpendicular to the axial direction of said focus drive coil, and
   a magnetic circuit having two magnets which are disposed outside a moving space of said bobbin and faced to said bobbin and a magnetic yoke for forming a magnetic flux to cross said focus drive coil and said tracking drive coils, wherein said magnetic yoke has a substantially rectangle shaped closed configuration and completely encircles said bobbin so that a plane transverse to the axis of said lens which intersects said magnetic yoke also intersects said bobbin and causes said magnetic circuit to loop therein.

3. An objective lens driving unit in accordance with claim 2, wherein said focus drive coil and said tracking drive coils are wound on said bobbin itself.

4. An objective lens driving unit in accordance with claim 2 or 3, wherein said axial direction of said focus drive coil is substantially parallel to the axial direction of said objective lens.

* * * * *